Patented Aug. 28, 1951

2,566,163

UNITED STATES PATENT OFFICE 2,566,163

MANUFACTURE OF TETRACHLORODI-FLUOROETHANE

John D. Calfee, Manhasset, N. Y., and Lee B. Smith, Woodbridge, N. J., assignors to Allied Chemical & Dye Corporation, a corporation of New York No Drawing. Application March 19, 1946, Serial No. 655,595

5 Claims. (Cl. 260—653)

This invention relates to manufacture of polychlorinated difluoroalkanes, and is directed particularly to the preparation of tetrachlorodifluoroethane, i. e., 1,1-difluoro-1,2,2,2-tertachloroethane, $CCl_2CF_2Cl$ (M. P. 42° C., B. P. 91.8° C.), a material which is especially useful as a solvent and as a chemical intermediate, and which is substantially less toxic than the related alkyl chlorides. The present improvements are described herein mostly in connection with production of tetrachlorodifluoroethane from ethylidene fluoride, $CH_3CHF_2$, a readily available raw material.

A mixture of ethylidene fluoride and sufficient chlorine to effect complete substitution of all the hydrogen atoms by chlorine may be heated by extraneous heat to relatively high temperatures to effect chlorination and formation of tetrachlorodifluoroethane. Such a direct thermal chlorination operation in which chlorination is effected by heat alone, while not ordinarily objectionable in chlorination procedures in general, in the particular reactions to which this invention relates possesses the marked commercial disadvantage that at the outset of heating, competing reactions take place with the result that HF splits out of the ethylidene fluoride. Further, aside from loss of the HF, it is not possible to get good yields of the desired product because of the various side reactions inherently effected.

The principal object of this invention is provision of processes by which it is possible to prepare polychlorinated difluoroalkanes containing not more than 2 carbon atoms, under conditions such that exhaustive chlorination, with or without so-called chlorinolysis (disunion of carbon atoms by the action of chlorine), may be accomplished without loss of HF and without giving rise to excessive quantities of undesired by-products.

As applied specifically to manufacture of tetrachlorodifluoroethane by chlorination of ethylidene fluoride, this invention is based on the discovery that if the ethylidene fluoride is preliminarily at least monochlorinated, e. g. to 1,1,1-chlorodifluoroethane, e. g. by actinic radiation, there is formed an intermediate product which may be thereafter further or completely chlorinated by the readily controllable and commercially feasible thermal method, that is, by externally heating such intermediate product in the presence of desired amounts of chlorine at relatively high temperatures. This discovery thus facilitates manufacture of tetrachlorodifluoroethane from readily available ethylidene fluoride raw material without the objectionable features characteristic of complete chlorination by the above mentioned direct thermal process. From another viewpoint, the invention comprises the discovery that an at least monochlorinated ethylidene fluoride, e. g. 1,1,1-difluorochloroethane, may be further chlorinated thermally by heating at temperatures not less than 300° C. without the aforementioned splitting out of HF and the attendant loss of HF and the formation of relatively large amounts of undesired by-products. We find that such chlorination may be carried out at temperatures in the range of 300–550° C., under which conditions chlorination may be exhaustive but without chlorinolysis, e. g. tetrachlorodifluoroethane being the product obtained. As more fully described and claimed in our copending application Serial No. 655,597, filed March 19, 1946, now Patent No. 2,459,767, further chlorination may be carried out in the presence of an adequate amount of chlorine at higher temperatures, above 550° C. and usually in the range of 750–950° C., under which conditions chlorination may be exhaustive and chlorinolysis effected, e. g. carbon tetrachloride and dichlorodifluoromethane being the products obtained.

In practice of a preferred embodiment of this invention, using ethylidene fluoride as the raw material, the improved process is carried out in two stages which may be represented by the following equations:

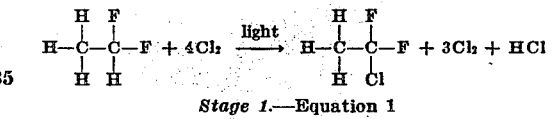

Stage 1.—Equation 1

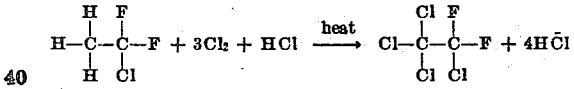

Stage 2.—Equation 2

As directed broadly to the preparation of polychlorinated difluoroalkanes, preferred practice of the invention process comprises at least monochlorinating ethylidene fluoride to form a resulting intermediate product containing at least one chlorine atom, and heating such resulting intermediate product at temperature of not less than 300° C. in the presence of sufficient chlorine to thereby form the desired polychlorinated difluoroalkane. As related specifically to the preferred mode of manufacture of tetrachlorodifluoroethane, the invention comprises at least monochlorinating ethylidene fluoride to form an intermediate product containing at least one chlorine atom, and heating this resulting intermediate product at temperature of not less than 300° C. and not more than 550° C. in the presence of at least sufficient chlorine to thereby form tetrachlorodifluoroethane.

In the practice of the preferred embodiments of the present invention, the at least monochlorination of ethylidene fluoride in Stage 1, preferably formation of 1,1,1-difluorochloroethane, is effected by actinic radiation. The reason why monochlorination by actinic radiation may be used so advantageously in conjunction with thermal chlorination (Stage 2), to provide a fast operating easily controllable overall process for making tetrachlorodifluoroethane, is that initiation of the chlorination operation by actinic radiation avoids the previously referred to splitting out of HF and undesirable side reactions characteristic of direct thermal chlorination of ethylidene fluoride.

Stage 1

With respect to production of 1,1,1-difluorochloroethane, it has been found that when ethylidene fluoride and chlorine are subjected to the action of actinic radiation (to the action of any light which effects chemical change) there is substantially immediately produced a gaseous reaction mixture comprising a recoverable mixture of reacted materials containing by weight a predominating amount of 1,1,1-difluorochloroethane. Under moderately favorable conditions of operation, such recoverable mixtures of reacted materials may contain by weight not less than 80–85% of 1,1,1-difluorochloroethane, and yields of this monochlorinated product may be 60% and higher. The foregoing is true whether the reaction may be effected in the presence of less than one, one, or substantially more than one molecular proportion of chlorine. The resulting reaction mixture is relatively stable, and if desired the contained 1,1,1-difluorochloroethane may be recovered as such by commercially feasible methods without the taking place of further chlorination and its attendant production of further amounts of polychlorinated or other undesirable side reaction products. Thus, the following reaction—

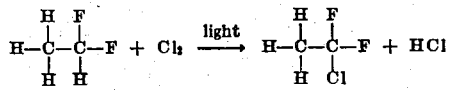

Equation 3 goes to a point at which the recoverable reacted materials contain by weight e. g. 80–85% and up of 1,1,1-difluorochloroethane, regardless of the presence of a substantial excess of available chlorine.

If desired, Stage 1 may be carried out in accordance with Equation 3, i. e. using one molecular proportion of chlorine. In this situation, it will be understood that substantially all the chlorine is used to monochlorinate the ethylidene fluoride, and that whatever chlorine may be needed in the rest of the process is introduced as the gas stream passes into Stage 2. However, use of a single molecular proportion of chlorine in Stage 1 affords no advantage, and ordinarily substantially more than one molecular proportion is employed and preferably all the chlorine used in the entire process is introduced into the system at the head end of Stage 1. Carrying out of the reaction of Stage 1 in the presence of a substantial excess of chlorine over that needed to monochlorinate the ethylidene fluoride has an advantage of insuring at least monochlorination of all of the ethylidene fluoride, and avoids the possibility of ethylidene fluoride as such entering Stage 2. If any material quantities of ethylidene fluoride were introduced into Stage 2, because of the high temperatures therein, HF would split out of the ethylidene fluoride, HF would be lost and undesirable side reactions effected. As indicated by Equations 1 and 3, the ethylidene fluoride monochlorinates to 1,1,1-difluorochloroethane predominantly. However, it will be understood that in accordance with the present invention it is not of major importance which hydrogen of the ethylidene fluoride is substituted by chlorine, it only being important, as far as successful operation is concerned, that at least one of the hydrogens of the ethylidene fluoride be substituted by chlorine.

As previously indicated, it is immaterial whether the actinic radiation reaction of Stage 1 is carried out in the presence of one or substantially more than one molecular proportion of chlorine. It is this inherent characteristic of the actinic radiation reaction of Stage 1 which affords the substantial advantage of putting all the chlorine used in the entire process into the gas stream as the latter enters Stage 1, and which makes operatively convenient the conjunctive use of the actinic radiation of Stage 1 and the final thermal chlorination of Stage 2. Since the operation of Stage 2 is such as to effect complete substitution of hydrogen whether the materials entering Stage 2 are mono or partly polychlorinated, it will be appreciated that in practicing Stage 1 operation need not be limited strictly to production of 1,1,1-difluorochloroethane, and the degree of chlorination effected and the time of retention of the reactants in the reaction zone of Stage 1 may vary considerably. On the other hand, from the standpoint of plant capacity there is no particular advantage afforded by carrying out Stage 1 in such a way as to form any material amounts of polychlorinated intermediate product, and it is preferred to control Stage 1 so that only complete monochlorination of ethylidene fluoride is effected. Stage 1 is readily adaptable to a continuous operation in which ethylidene fluoride and all of the chlorine used in the entire process are continuously introduced into a reaction zone, subjected therein to the action of actinic radiation, and the resulting reaction mixture continuously discharged from the reaction zone. When the raw materials are continuously introduced into the reaction zone of Stage 1, subjected to the action of actinic radiation therein, and the resulting reaction mixture continuously discharged, there is formed a reaction zone effluent gas mixture containing most of the ethylidene fluoride as 1,1,1-difluorochloroethane, minimum amounts of undesired side reaction products, and all of the unreacted chlorine.

The reaction of Stage 1 may be carried out conveniently by passing the starting materials into and thru a glass enclosed reaction space, such as the annular space formed by surrounding a fluorescent light tube with a glass tube of larger diameter. Any form of light which effects chemical reaction may be employed, such as diffused daylight, infra-red rays, ultra violet rays, ordinary incandescent lamps, although fluorescent light is preferred.

In the practice of Stage 1, good conversion of ethylidene fluoride depends upon space velocity per hour (volumes of reactant gas at room temperature per volume of reaction chamber per hour), ethylidene fluoride to chlorine mol ratio, light intensity, temperature, and substantial absence of oxygen in the reaction mixture. The term "conversion" indicates the percentage by weight of starting material which reacts during the course of the reaction. Space velocity per hour should be preferably not more than 600 and ordinarily in the range of 200 to 300. For the reasons above indicated, in the preferred embodiments of the invention, substantially more than one molecular proportion and usually all of the chlorine needed in the entire process is employed. The reaction is exothermic although not highly so. In most operations, particularly using fluorescent light, temperature control of the reactors has been unnecessary, since temperatures automatically maintain themselves within the range from about room temperature to about 300° C. Should operations be of such character as to develop undue amounts of heat, any suitable cooling means to keep temperature below about 300° C. may be employed. The reaction proceeds in the presence of any amount of actinic radiation, although the speed of reaction appears to be directly proportional to the intensity of light. Oxygen inhibits the chlorination reaction, and in practice the process is carried out under conditions such that the reaction is effected in the presence of less than 0.1% by weight of oxygen based on the amount of ethylidene fluoride charged.

The exit gas from the reactor of Stage 1 contains chlorine, HCl, 1,1,1 - difluorochloroethane (B.P. minus 9.6), and smaller amounts of $CH_2ClCHF_2$, boiling at about 35° C., $CH_2ClCF_2Cl$ boiling at about 47° C., and $CHCl_2CHF_2$ boiling at about 60° C.

Stage 2

When the reaction of Stage 1 is carried out as represented by Equation 1, the effluent gas of Stage 1 contains three molecular proportions of chlorine, such amount of chlorine being sufficient, as indicated by Equation 2, to complete chlorination of the original ethylidene fluoride. For this purpose the effluent gas of Stage 1 may be introduced into a tubular reactor of suitable length. The reactor of Stage 2 is provided with a suitable external heating jacket together with means for maintaining controlled temperatures within the reactor. In Stage 2, the reaction is carried out preferably in the absence of a catalyst, and hence the reactor is preferably made of a neutral or non-catalytic material such as graphite.

In accordance with the invention it has been found that complete chlorination may be effected by maintaining temperatures in the Stage 2 reactor at not less than 300° C., and not more than 550 C. Minimum temperature of about 300° C. is necessary to initiate and maintain completion of chlorination, and temperatures of about 550° C. should not be exceeded in order to prevent inception of chlorinolysis, i. e. disunion of carbon atoms by the action of chlorine. For practical purposes, space velocity per hour in the reactor of Stage 2 should not materially exceed 3000. Assuming the presence of sufficient chlorine to substitute for all of the hydrogen atoms of the intermediate reaction product of Stage 1, completion of chlorination in the reactor of Stage 2 takes place with great rapidity. Yield of tetrachlorodifluoroethane is usually of the order of about 90%, and ordinarily less than 10% by weight of the initial ethylidene fluoride is converted to other chlorinated materials, results of this nature being obtained readily when the reactor is maintained at the preferred operating temperatures in the range of 400–500° C. The term "yield" denotes the percent by weight of ethylidene fluoride input which is recovered as the desired end product.

To recover the desired 1,1-difluoro-1,2,2,2-tetrachloroethane product, the effluent of the reactor of Stage 2 may be fed into a water scrubber in the bottom of which, depending upon temperature conditions in the scrubber, the tetrachlorodifluoroethane and some small amount of less highly chlorinated material such as trichlorodifluoroethane collect as an oil or a solid. The supernatant water dissolves HCl, and any excess chlorine which may have been present passes thru the water scrubber. After separation from the water in the scrubber, the tetrachlorodifluoroethane material may be washed with a mild caustic solution to remove last traces of HCl, and the caustic-washed material may be distilled under suitable conditions to recover tetrachlorodifluoroethane in the desired degree of purity.

Stage 2 does not need to be used necessarily to effect complete chlorination. By suitably limiting the amount of available chlorine a lesser degree of further chlorination of the intermediate reaction product of Stage 1 may be effected in Stage 2, and material produced such as trichlorodifluoroethane may be recovered by suitable distillation.

From the foregoing, it will be seen that, as related to manufacture of polychlorinated difluoroalkane, one aspect of the invention comprises initiating chlorination of ethylidene fluoride by actinic radiation and effecting further chlorination thermally by external heating.

The 1,1,1-difluorochloroethane used in Stage 2 may be prepared by methods other than actinic radiation. For example, methyl chloroform may be fluorinated using antimony trifluoride as the fluorinating agent to accomplish replacement of 2 of the chlorine atoms in the methyl chloroform by fluorine; similarly, methyl chloroform may be fluorinated using anhydrous hydrofluoric acid as a fluorinating agent.

Following is a representative example for making tetrachlorodifluoroethane from ethylidene fluoride. Ethylidene fluoride and chlorine in gaseous phase were fed from their respective containers in molar ratio of 1:4–1:4.2, intimately mixed and introduced into an actinic radiation reaction space which consisted of an annular chamber formed between the outside of a tubular fluorescent lamp and cylindrical jacket surrounding said lamp. Mixed gases were fed at such a rate that the space velocity per hour thru this reactor was about 200. In this stage, substantially all of the ethylidene fluoride was chlorinated to some degree, most of it to 1,1,1-difluorochloroethane. Temperature in this reactor was in the range of 200–300° C. Without any treatment, the tail gases of the actinic radiation were fed into a Stage 2 reactor which consisted of a graphite tube surrounded by a suitable jacket and provided with means for heating and maintaining controlled temperatures. The size of this reactor was so designed that the tail gases above, passed thru the Stage 2 reactor at a space velocity per hour of about 2200–3000. Temperature in this reactor was held at about 475° C. In the Stage 2 reactor exhaustive chlorination took place with substantially no disunion of the carbon atoms.

Stage 2 reactor tail gases, containing a major portion of tetrachlorodifluoroethane, some trichlorodifluoroethane ($CHCl_2CClF_2$, B. P. 71° C.), and relatively small amounts of lower chlorinated materials were passed into a receiver externally packed with ice. Chlorinated reaction products condensed and formed a mushy semi-liquid mass comprising tetrachlorodifluoroethane, trichlorodifluoroethane and lower chlorinated material. The gases exiting the receiver were scrubbed with water in which chlorinated products still contained in the gas stream were collected partly as solids and partly as a heavy oil. After separation of the mixture of heavy oil and suspended solids from the water by decantation, such mixture was combined with the mushy semi-liquids mass withdrawn from the receiver. The resulting combined mass was then washed with dilute alkali to remove chlorine and acidity, and the washed mass was distilled under conditions to separate out the lower boiling lower chlorinated materials, leaving tetrachlorodifluoroethane in the still as a residue. By using in the entire process 198 parts by weight of ethylidene fluoride and 895 parts of chlorine, the combined products recovered were 500 parts tetrachlorodifluoroethane and 81 parts of lower chlorinated material.

We claim:

1. The process for preparing tetrachlorodifluoroethane which comprises continuously introducing ethylidene fluoride and not less than four molecular proportions of chlorine into a reaction zone, subjecting the material therein to the action of actinic radiation while maintaining temperature in the range from about room temperature to about 300° C. and space velocity per hour in the range of 200-300, continuously discharging the resulting reaction mixture from said zone to thereby recover a reaction mixture containing 1,1-difluorochloroethane and residual free chlorine, continuously introducing said reaction mixture into a second reaction zone, and heating said mixture therein at temperature of not less than 400° C. and not more than 500° C. in the presence of said residual chlorine to thereby form said tetrachlorodifluoroethane.

2. The process which comprises heating an at least mono- but incompletely chlorinated 1,1-difluoroethane at temperature not less than 300° C. and not more than 550° C. in the dark and in the presence of chlorine in amount to form a more highly chlorinated 1,1-difluoroethane.

3. The process which comprises heating an at least mono- but incompletely chlorinated ethylidene fluoride at temperature not less than 300° C. and not more than 550° C. in the dark and in the presence of at least sufficient chlorine to form tetrachlorodifluoroethane.

4. The process which comprises heating 1,1,1-difluorochloroethane at temperature not less than 400° C. and not more than 500° C. in the dark and in the presence of at least sufficient chlorine to form tetrachlorodifluoroethane.

5. The process which comprises subjecting to actinic radiation a mixture of ethylidene fluoride and sufficient chlorine to ultimatly form tetrachlorodifluoroethane while maintaining temperature in the range of about room temperature to about 300° C. for time sufficient to produce a resulting reaction mixture containing residual free chlorine and at least mono- but incompletely chlorinated ethylidene fluoride, and heating said resulting reaction mixture at temperature not less than 300° C. and not more than 550° C. in the presence of said residual chlorine to thereby form tetrachlorodifluoroethane.

JOHN D. CALFEE.
LEE B. SMITH.

REFERENCES CITED

The following references are of record in the file of this patent:

UNITED STATES PATENTS

| Number | Name | Date |
|---|---|---|
| 2,007,208 | Midgley et al. | July 9, 1935 |
| 2,469,290 | Calfee | May 3, 1949 |

OTHER REFERENCES

Henne et al.: "Journal of the American Chemical Society," vol. 58, pages 889–890 (1936).

Henne et al.: "Journal of the American Chemical Society," vol. 61, pages 938–940 (1939).

McBee et al.: "Journal of the American Chemical Society," vol. 62, pages 3340–3341 (1940).

Henne et al.: "Directed Chlorination of Aliphatic Fluorides," J. A. C. S., vol. 67 (1945), pages 1906–8.